United States Patent [19]

Pollet et al.

[11] Patent Number: 4,826,549

[45] Date of Patent: May 2, 1989

[54] FILAMENTARY SPLICING

[75] Inventors: Jean-Claude Pollet, Granville; Joseph Yu, Westerville, both of Ohio

[73] Assignee: Owens-Corning Fiberglas Corporation, Toledo, Ohio

[21] Appl. No.: 605,361

[22] Filed: Apr. 30, 1984

[51] Int. Cl.$^4$ .............................. B29C 6/04; B29F 1/00
[52] U.S. Cl. .................................... 156/158; 156/166; 156/304.2; 156/344
[58] Field of Search .................... 156/158, 157, 304.2, 156/502, 509, 578, 504, 508, 433, 344, 166; 57/22; 242/35.6 R, 35.6 E

[56] References Cited

U.S. PATENT DOCUMENTS

| | | | |
|---|---|---|---|
| 2,298,676 | 10/1942 | Camp | 156/158 |
| 2,449,349 | 9/1948 | Waught et al. | 57/22 |
| 3,420,725 | 1/1969 | Curry | 156/157 |

*Primary Examiner*—Michael Ball
*Attorney, Agent, or Firm*—Patrick P. Pacella

[57] ABSTRACT

A method of processing spliced filamentary materials within which the filamentary material is spliced with a hardenable friable, splicing material, the filamentary material then being processed to break the friable splice.

5 Claims, No Drawings

FILAMENTARY SPLICING

This invention relates to a method of splicing filamentary material.

In one of its more specific aspects, this invention relates to a method of processing spliced strands which method avoids knotting and facilitates the use of the spliced regions as reinforcement.

BACKGROUND OF THE INVENTION

The production of filamentary material in packages and the use of that material in continuous lengths is well know. For example, glass is produced in the form of strands and the strands gathered into rovings. These can be chopped to produce short-length fibers or used in continuous lengths as reinforcement in such materials as sheet molding compounds and bulk molding compounds. Inasmuch as the packages in which filamentary material is produced is of limited size, it is the practice to interconnect the end of one package with the beginning of another package to provide for continuity of the strands. "Transfer knots" have been used for such purposes.

However, the use of knots is disadvantageous in that strand choppers are not capable of chopping such knots with the result that the knots pass through the copper and are found almost intact in the material in which they are incorporated and in which they create localized regions of highly packed, undispersed glass. The ultimate consequence is the creation of defects in the part.

Attempts to replace such knots by use of adhesives or splicing have not been successful because such attempts have failed to provide splicings which do not produce localized and visible regions of high glass concentration and non-randomized distribution of the glass in the finished part at the adhesive or splicing.

The present invention is directed to the solution of that problem.

STATEMENT OF THE INVENTION

The method of this invention pertains to a method of processing spliced filamentary materials which comprises placing portions of filamentary materials in splicing relationship, applying a hardenable material to the segments to maintain the segments in spliced relationship, hardening said material to form a friable bond between the portions and processing the spliced filamentary material to break the friable bond.

DESCRIPTION OF THE INVENTION

As employed herein, the term filamentary material applies to any material of a length sufficient to allow the application of the splicing material. Both short and continuous lengths are intended as are materials comprised of a single strand and rovings comprised of a plurality of strands.

Such materials can be spliced at any portions along their length. While terminal portions are preferred, splices at other points can be made with, or without, severing the overlapping, unspliced portions.

The method of this invention is applicable to any method of splicing which produces a friable, hardened material which maintains the strands in spliced relationship. Relatedly, the method is applicable to splicing any filamentary material for incorporation in any compound for reinforcing or other purposes.

The spliced filamentary material can be processed in any desired manner. It can be chopped and distributed onto a substrate, collected as a mat, and the like, or it can be employed in continuous lengths.

The friable bond can be broken by any method of processing. It can be broken by ejecting through a spray nozzle, by application of gaseous pressure, by pressure applied by rolling, kneading, by shock, and the like, or by heating to melt the bond.

The friable bond can be broken to any desirable extent. Preferably, it will be broken sufficiently to permit filamentizing of the spliced material and to facilitate solution of the splicing material in a medium with which it is processed and to avoid the presence of residual particles of the splicing material in the processed material as surface irregularities.

For purposes of convenience, the invention will be explained in terms of splicing glass filaments and incorporating the spliced filaments in molding compositions such as sheet molding compounds and bulk molding compounds.

In general, the friable material can be broken at any point within the processing of the materials into which the spliced material is placed.

Preferably, the materials employed in this invention will be hot melt materials which solidify upon cooling to form friable splices which are readily soluble or dispersible in the medium into which they are incorporated. The splicing material should preferably correspond in color to that material in which the splices are incorporated. Also, the splicing materials must possess sufficient strength to enable handling of the strands to avoid breakage of the splice at that portion of the process at which breakage is not desired. Generally, a tensile strength greater than about 10 Newtons is desired between the spliced strands. For example, a typical range of tensile strength will be from about 40 Newtons to about 130 Newtons.

However, the friable material must be of such a nature as to disintegrate as the material passes through the machine, for example, through an SMC idler roller or a chopper. Further, the friable material should be compatible with the compound into which the strands are incorporated, preferably in respect to solubility particularly when, as in the case of sheet molding compound, a crosslinking monomer may be present.

Still further, the friable material should remain intact without premature softening over a wide range of temperatures to which the strands might be subjected prior to employment.

Any suitable resin material, preferably having a low molecular weight can be employed. Preferably, for SMC reinforcement, a resin having a number-average molecular weight within the range of from about 200 to about 2000, having a ring and ball softening point from about 70° C. to about 140° C. and a melt viscosity at a temperature at which it is supplied to the terminal portions of the filamentary material low enough to penetrate the roving, if employed, that is, within the range of from about 20 to about 2000 centipoises and, preferably, about 200 centipoises at the application temperature.

There are many materials which meet the aforementioned criteria including polystyrene resins, styrene - allyl alcohol resins, sucrose benzoate, aromatic hydrocarbon resins, and mixtures thereof.

One suitable material is low molecular weight, thermoplastic polystyrene, having a number average molecular weight within the range of from about 400 to about 800 and a ring and ball softening point about 70° C. Such a material is available from Hercules Incorporated as Piccolostic A-75. This material has a ring and ball softening point of 75° C., an acid number less than 1, a bromine number of about 2.7 and a melt viscosity of 1 poise at 150° C.

Other suitable materials are low molecular weight copolymers of styrene and allyl alcohol having a number average molecular weight within the range of from about 1150 to about 1600. These materials are available from Monsanto as RJ101 and RJ100. They contain about 7.7 to 5.7 percent hydroxyl by weight and have a Durran softening point of 95° C. to 110° C.

Still another suitable material is sucrose benzoate, a benzoic acid ester of sucrose having a molecular weight of about 1100 and available from Velsicol Chemical Corporation. This material has a ring and ball softening point of about 98° C. and a specific gravity (25/25) of 1.25.

Also satisfactory are low molecular weight phenolic-modified terpene resins having a number average molecular weight within the range of from about 400 to about 600, such as Piccofyn A-135 from Hercules Chemical Incorporated. Such materials have a ring and ball softening point of 132°-138° C., a density of 8.6 #/gal and a melt viscosity of 1 poise at 220° C.

Also satisfactory are coumarone-indene resins having a number average molecular weight within the range of from about 600 to about 800, such as Cumar R-1 and Cumar R-13 available from Neville Chemical Company. Their ring and ball softening point is within a range from about 100° C. to about 125° C.

It is also advantageous to use a mixture of such materials.

The filamentary material can be spliced in any suitable manner which enables continuity of the strand. Both overlap and end-to-end methods can be employed with the overlap method being preferred, with all the ends of a strand, if employed, being encapsulated in the splicing material. The usual splicing procedures as to quantity of splicing material, dimensions of the spliced region, and the like can be employed. The spliced region can be of any suitable configuration and can be molded, if desired, into a non-circular cross-section to facilitate its being crushed in the subsequent processing.

It will be evident from the foregoing that various modifications can be made to this invention. Such, however, are within the scope of the invention.

We claim:

1. A method of processing spliced filamentary materials which comprises placing portions of filamentary materials in splicing relationship, applying a hardenable material to the segments to maintain the segments in spliced relationship, hardening said material to form a friable bond between the segments and friable bond possessing sufficient strength to enable handling of the filamentary materials and to avoid breakage of the bond at this point of processing and processing the filamentary material to break the friable bond by applying pressure to the bond, said friable bond being of such a nature as to disintegrate at this point of processing.

2. The method of claim 1 in which said bond is soluble in a material comprising the sheet molding compound or bulk molding compound.

3. The method of claim 2 wherein the sheet molding compound or bulk molding compound includes styrene.

4. A process according to claim 1 wherein the friable bond has a tensile strength ranging from about 40 Newtons to about 130 Newtons.

5. A method of processing spliced filamentary materials which comprises placing portions of filamentary materials in splicing relationship, applying a hardenable material to the segments to maintain the segments in spliced relationship, hardening said material to form a friable bond between the segments said friable bond possessing sufficient strength to enable handling of the filamentary materials and to avoid breakage of the bond at this point of processing and processing the filamentary material to break the friable bond said friable bond being of such a nature as to disintegrate at this point of processing wherein the spliced filamentary material is incorporated in sheet molding or bulk molding compound which is processed to break said bond.

* * * * *